United States Patent [19]
Ito et al.

[11] Patent Number: 6,000,209
[45] Date of Patent: Dec. 14, 1999

[54] METHOD AND APPARATUS FOR MANUFACTURING SZ-SLOT TYPE OPTICAL FIBER CABLE

[75] Inventors: Yasushi Ito; Noboru Tokairin; Saburo Kawabata; Takashi Saitoh; Kiyotaka Nishioka, all of Yokohama, Japan

[73] Assignee: Sumitomo Electric Industries, Ltd., Osaka, Japan

[21] Appl. No.: 08/994,045

[22] Filed: Dec. 19, 1997

[30] Foreign Application Priority Data

| Dec. 19, 1996 | [JP] | Japan | 8-339364 |
| Nov. 4, 1997 | [JP] | Japan | 9-301535 |
| Dec. 3, 1997 | [JP] | Japan | 9-332542 |

[51] Int. Cl.$^6$ ........................ D01H 5/00
[52] U.S. Cl. ........................ 57/293; 57/294
[58] Field of Search ........................ 57/99, 293, 294

[56] References Cited

U.S. PATENT DOCUMENTS

| 4,154,049 | 5/1979 | King et al. | 57/9 |
| 4,384,446 | 5/1983 | Hope et al. | 57/6 |
| 4,395,869 | 8/1983 | Priaroggia et al. | 57/13 |
| 4,619,107 | 10/1986 | Missout et al. | 57/294 X |
| 4,620,412 | 11/1986 | Portinari | 57/6 |
| 4,635,430 | 1/1987 | Missout et al. | 57/6 |
| 4,663,926 | 5/1987 | Girardon et al. | 57/6 |
| 4,757,675 | 7/1988 | Oglesby et al. | 57/6 |
| 4,833,871 | 5/1989 | Ogawa et al. | 57/293 X |
| 5,315,813 | 5/1994 | Ito et al. | 57/294 X |

FOREIGN PATENT DOCUMENTS

| 278 431 | 8/1988 | European Pat. Off. . |
| 521503A1 | 1/1993 | European Pat. Off. . |
| 2-238413 | 9/1990 | Japan . |
| 2229461 | 9/1990 | United Kingdom . |

OTHER PUBLICATIONS

Patent Abstracts of Japan—63262610, Oct. 1998 and JP 61–097203 (Apr. 20, 1987= Fukushima Yoji= "Manufacturing Device for Spacer Type Optical Communication Cable".

Patent Abstract of Japan—60241004, Nov. 29, 1985 and JP 59097206 (May 15, 1984)—Miyajima Yukio= "Manufacture of Optical Fiber Cable".

*Primary Examiner*—William Stryjewski
*Attorney, Agent, or Firm*—Pillsbury Madison & Sutro LLP

[57] ABSTRACT

Torsional fixation portions holding an SZ slotted body having spiral grooves turning over alternately in the surface of its column body are provided to prevent the SZ slotted body from being distorted, and between the torsional fixation portions, a groove fixation device with one or more protrusion projecting into the spiral grooves of the SZ slotted body to prevent the grooves front turning in the sectionally circumferential direction in provided. The SZ slotted body is passed through the groove fixation device while the SZ slotted body advanced straight. Optical fibers are introduced and stored into the grooves of the SZ slotted body in the vicinity of the groove fixation device, and immediately a pressing winding consisting of yarn, tape or the like is given onto the SZ slotted body.

28 Claims, 9 Drawing Sheets

METHOD AND APPARATUS FOR MANUFACTURING SZ-SLOT TYPE OPTICAL FIBER CABLE

BACKGROUND OF THE INVENTION

1. Field of the Invention

The present invention relates to a method of manufacturing an SZ-slot type optical fiber cable in which optical fibers are stored in spiral grooves which are provided in an SZ slotted body so as to turn over alternately.

2. Description of the Related Art

An optical fiber cable in which spiral grooves are provided in a columnar member so an to store optical fibers therein is well known as protecting delicate optical fibers from various kinds of stresses and being capable of storing optical fibers at a high density.

In addition, a slotted body in which the directions of spiral grooves are made to turn over alternately is called an SZ slotted body, and adopted as one type of slot-type optical fiber cables, by which only desired optical fiber can be extracted easily only by removing an outer jacketing member in an intermediate portion without cutting the cable. An example of such a slotted body in shown in FIGS. 5 and 6.

Figure 5:
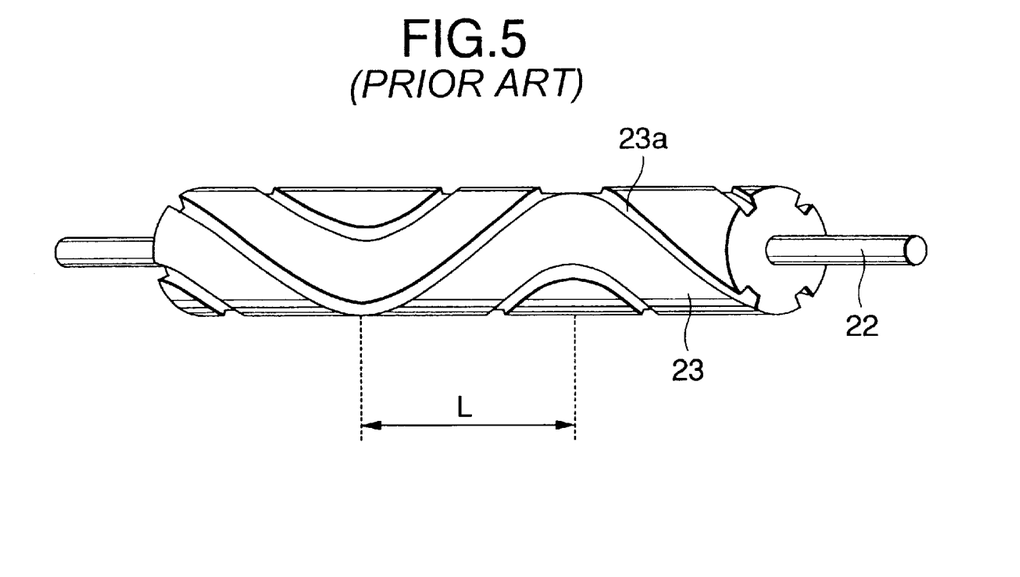
FIG. 5 is a view illustrating an example of SZ slotted body.

FIG. 5 shows an example of an SZ slotted body constituted by a tensils strength member 22 formed from a steal wire, a steel strand, an FRP rod or the like, and an optical fiber storage body 23 formed from a plastic material such as polyethylene and provided with spiral grooves 23a turning over alternately in its outer circumferential surface. In accordance with necessity, there is a case where a columnar rod formed from metal such as aluminum which is completely solid to its center portion so as to omit the central tensile strength body and which is provided with spiral grooves formed in its surface so as to turn over alternately is adopted as an SZ slotted body.

Figure 6:
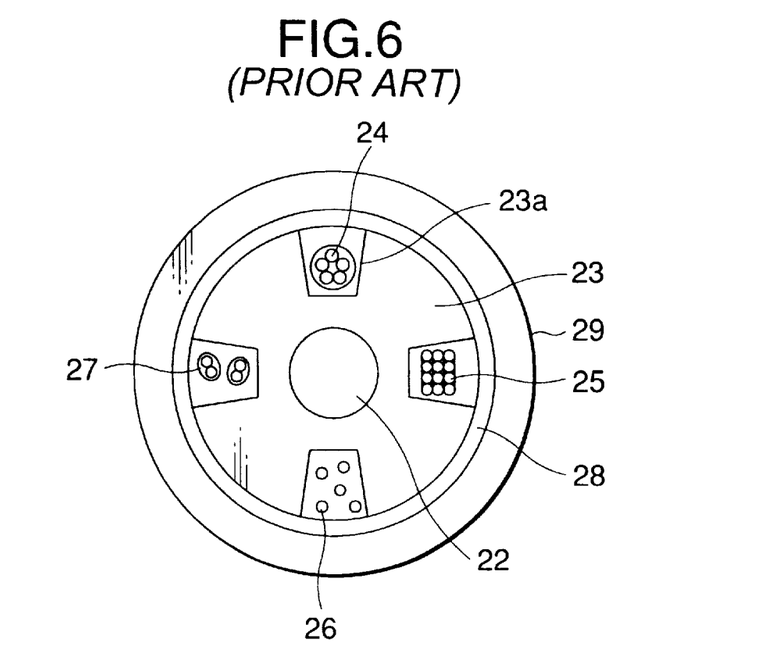
FIG. 6 in a view illustrating an example of an SZ-slot type optical fiber cable.

In addition, optical fibers are stored in the grooves. As for the formation of the optical fibers in a groove, there are various forms as shown in FIG. 6. The reference numeral 24 represents a bundle of a plurality of coated glass fibers wound with yarn, tape or the like, 25 represents a stack of optical fiber ribbons, each ribbon being formed of a plurality of coated glass fibers arranged side by side and collectively coated so as to be made into a ribbon, 26 represents a coated glass fiber disposed in a groove, and 27 represents a unit of coated glass fibers, each unit being two coated glass fibers further coated collectively. In this way, various forms of optical fiber formation can be considered. Although different forms of optical fiber formation are shown in the respective grooves in FIG. 6 by way example, optical fibers stored in the grooves of one optical fiber cable are, in most of cases, in the same formation. In addition, in FIG. 6, the reference numeral 29 represents a winding tape, and 29 represents an outside jacketing of a plastic material or the like.

Figure 7:
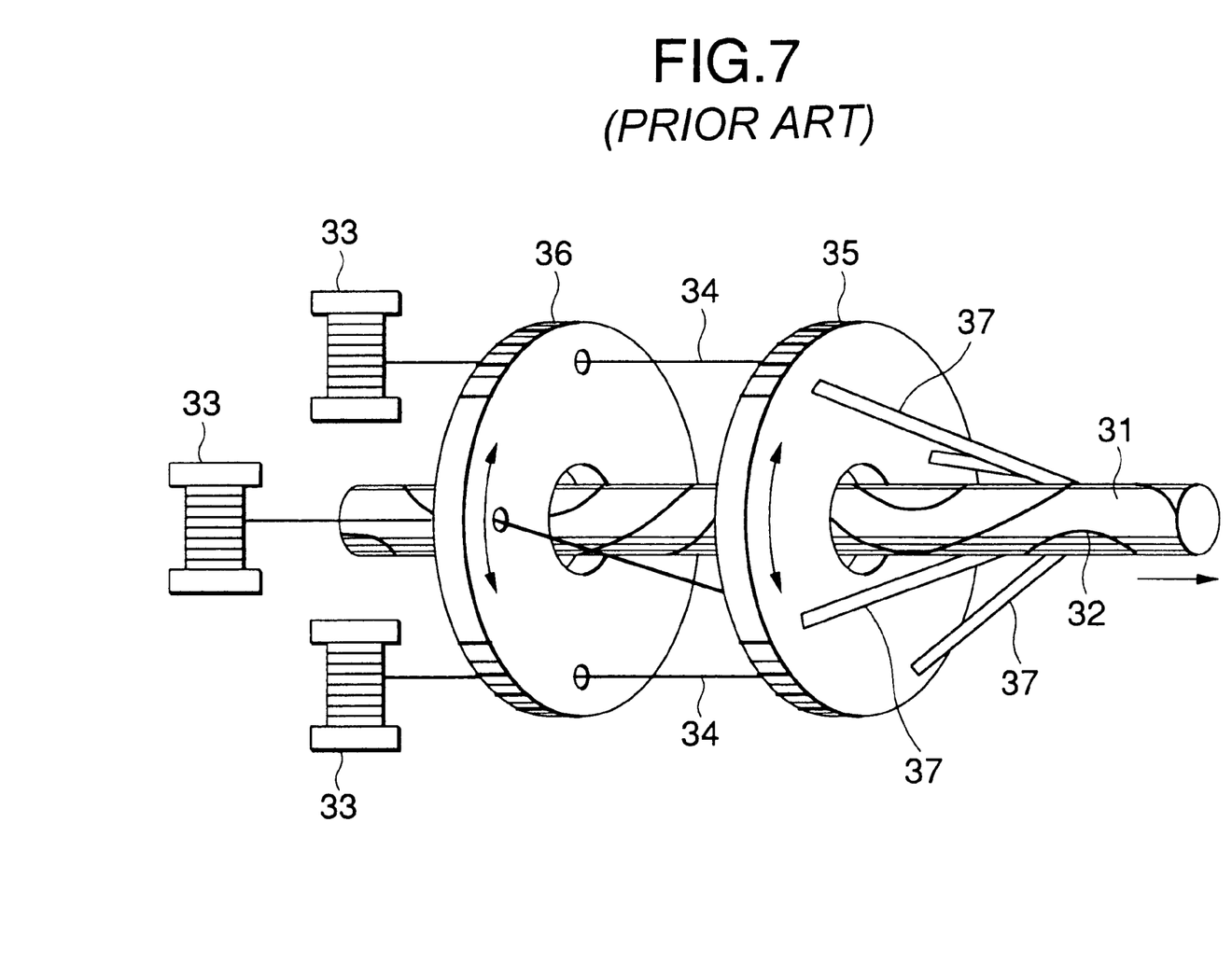
FIG. 7 is a view of an assembly unit used in a conventional manufacturing method.

To manufacture such a kind of SZ-slot type optical fiber cable, such an assembling unit as shown in FIG. 7 has been generally used. In FIG. 7, the reference numeral 31 represents an SZ slotted body; 32, spiral grooves formed in the SZ slotted body so as to turn over alternately; 33, supply bobbins; 34, optical fibers; 35 and 36, guide disks rotating around the axis while turning ever alternately; and 37, guide pipes for guiding the optical fibers. In the manufacturing method using this assembling unit, the optical fibers 34 supplied from the supply bobbins 33 are passed through the guide disks 36 and 35 rotating around the axis while turning over alternately, passed through the guide pipes 37, and introduced into the spiral grooves formed in the SZ slotted body and turned over alternately.

The guide pipes 37 are attached to the guide disk 35, so that the pipes 37 rotate around the axis together with the guide disk 35 synchronously with the rotation of the spiral grooves 32 around the axis as the SZ slotted body 31 advances in the direction of the arrow. One of the end portions of each of the guide pipes 37 is disposed above one of the spiral grooves to introduce an optical fiber or stack of optical fiber ribbons extracted therefrom into the spiral groove.

In such a conventional manufacturing method, in a section where the spiral grooves do not turn over alternately, because the supply bobbins 33 do not rotate around the axis, the guide disk 35 rotates in one direction so that the optical fibers positioned between the supply bobbins 33 and the guide disk 35 are wound on the body around the axis at an angle that corresponds to the rotation angle of the guide disk 35. Since the intermediate portions of the optical fibers are guided by the guide disk 36, there is no fear that the optical fibers touch the SZ slotted body or the like in the intermediate portions if the rotation angle is not so large before alternate turn-over, However, if the rotation angle is so large before turn-over, the optical fibers may be wound on the SZ slotted body in a position between the supply bobbins 33 and the guide disk 36 or between the guide disk 36 and the guide disk 35.

In addition, most of SZ slotted bodies have tensile strength wires in their center as shown in FIG. 5. An such a tensile strength wire, representatively, a single steel wire or steel strands in which a plurality of steel wires twisted are used. However, local axial torsion dwells in these steel wires or steel strands as scattering when they are manufactured. This torsion is released when the SZ slotted body is extended, and even if the SZ slotted body is extracted and advanced straight, it occurs that the SZ slotted body rotates around the axis suddenly when it comes to the above-mentioned place where the torsion is released. And then, it is difficult to forecast when this rotation caused by the release of the torsion will occur.

When there occurs irregular rotation around the axis of the SZ slotted body caused by the release of local torsion of the tensile strength wire, there is a case where the optical fibers are wound around the SZ slotted body irregularly, so that the optical fibers are injured, or given large stress so as to provide an adverse influence on their transmission lose. Although working at a low speed can be also considered in order to prevent such a case, it is not preferable economically.

SUMMARY OF THE INVENTION

The present invention has been made under the above circumstances, and therefore an object of the present invention is to provide a manufacturing method to solve the foregoing conventional problems.

According to the present invention, there is provided a method of manufacturing an SZ-slot type optical fiber cable in which optical fibers are stored in spiral grooves which a formed in a surface of a columnar SZ slotted body so as to turn ever alternately, characterized in that at least two torsion fixing units are provided around a slot axis to hold the SZ slotted body so as to prevent the SZ slotted body from being distorted, wherein the SZ slotted body is passed through a groove fixation device while the SZ slotted body is advanced straight between two of the torsion fixing unit, the groove fixation device having one or more protrusions projecting into the grooves of the SZ slotted to allow its advance while retaining the positions of the grooves substantially constant circumferentially about the optical fiber insertion point, and wherein optical fibers are introduced and stored into the grooves of the SZ slotted body in the vicinity of the groove fixation device, and immediately a pressing winding consisting of yarn, tape or the like is applied onto the SZ slotted body.

In addition, a brake unit constituted by a plurality of wheels for giving a braking force to the advance of the SZ slotted body, and a pulling device constituted by a plurality of wheels giving a pulling force to the SZ slotted body storing the optical fibers may be used as the torsion fixing units.

The distance between the groove fixation device and each of the torsion fixing devices may be set to 3 m or more respectively, so that torsion generated in the SZ slotted body can be diffused satisfactorily by the groove fixation device.

In addition, if one or a plurality of holes are provided at the circumference of the groove fixation device which is away from the center of the groove fixation device at a distance not exceeding two times as large as the radius of the SZ slotted body, and the optical fibers are inserted into and through the holes to be inserted into the grooves of the SZ slotted body, the optical fibers having passed through the holes of the groove fixation device can be inserted into the grooves of the SZ slotted body smoothly.

Further, if one or more turns of string the both ends of which have been fixed through springs are wound around the outer circumference of the SZ slotted body at the insertion point there the optical fibers are inserted into the spiral grooves of the SZ slotted body turning over alternately, the optical fibers can be inserted into the grooves in a state where their arrangement is kept as it is, even if the optical fibers are plural in number and shaped into a stack.

If the distance between the groove fixation device and the insertion point where the optical fibers are inserted into the grooves of the SZ slotted body is set to be 1/10 or less as large as the SZ turn-over distance, the optical fibers can be inserted into the grooves of the SZ slotted body more smoothly.

In addition, it the distance between the insertion point of the optical fibers and the head of the pressing winding is set to be not more than 1/3 of the SZ turn-over distance, it is also possible to prevent the optical fibers, once inserted into the spiral grooves of the SZ slotted body from jumping out of the grooves.

Further, if the spiral angle of the pressing winding consisting of yarn, tape or the like is made two or more times as large as the maximum spiral angle of the grooves of the SZ slotted body, it is also possible to prevent the pressing winding from falling into the grooves of the SZ slotted body to injure the optical fibers.

In addition, a plurality of glass coated fibers disposed side by side and collectively coated so as to be made into a ribbon-like optical fiber unit, and a plurality of such ribbon-like optical fiber units are stacked. When the ribbon-like optical fiber units are stacked in each groove of the SZ slotted body, the guide is passed through an optical fiber insertion hole of the groove fixation device with a clearance and the stacked ribbon-like optical fiber units are inserted through the hole of the guide while the ribbon-like optical fiber units are kept in the stacked state, so that it is possible to prevent the stacked state from being broken.

It the guide is made to be able to oscillate with respect to the groove fixation device in accordance with the direction of the optical fibers, it is possible to guide the optical fibers to the groove of the SZ slotted body smoothly while keeping the stacked state, In addition, If a protrusion is provided at the front end of the guide and the protrusion is inserted into the groove of the SZ slotted body, the guide can oscillate in accordance with the motion of the SZ slotted body, so that it is possibly to guide the optical fibers to the groove of the SZ slotted body more smoothly.

The hole of the guide is made to be a hole rectangular or circular in section which is slightly larger than the section of the stacked ribon-like optical fiber unit so that the stacked state of the stacked ribbon-like optical fiber unit can be kept. Further, in the case where the section of the hole of the guide is made circular, an arrangement keeping guide having a hole rectangular in section the size of which is slightly larger than the section of the stacked ribbon-like optical fiber unit is provided in front of the first-mentioned guide go that the stacked ribbon-like optical fiber unit is introduced into the groove of the SZ slotted body through the respective holes of the arrangement keeping guide and the first-mentioned guide to thereby more improve the stacked-state keeping property.

The above and other objects and features of the present invention will be more apparent from the following description taken in conjunction with the accompanying drawings.

DETAILED DESCRIPTION OF THE PREFERRED EMBODIMENTS

A description will be give in more detail of preferred embodiments of the present invention with reference to the accompanying drawings.

Figure 1:
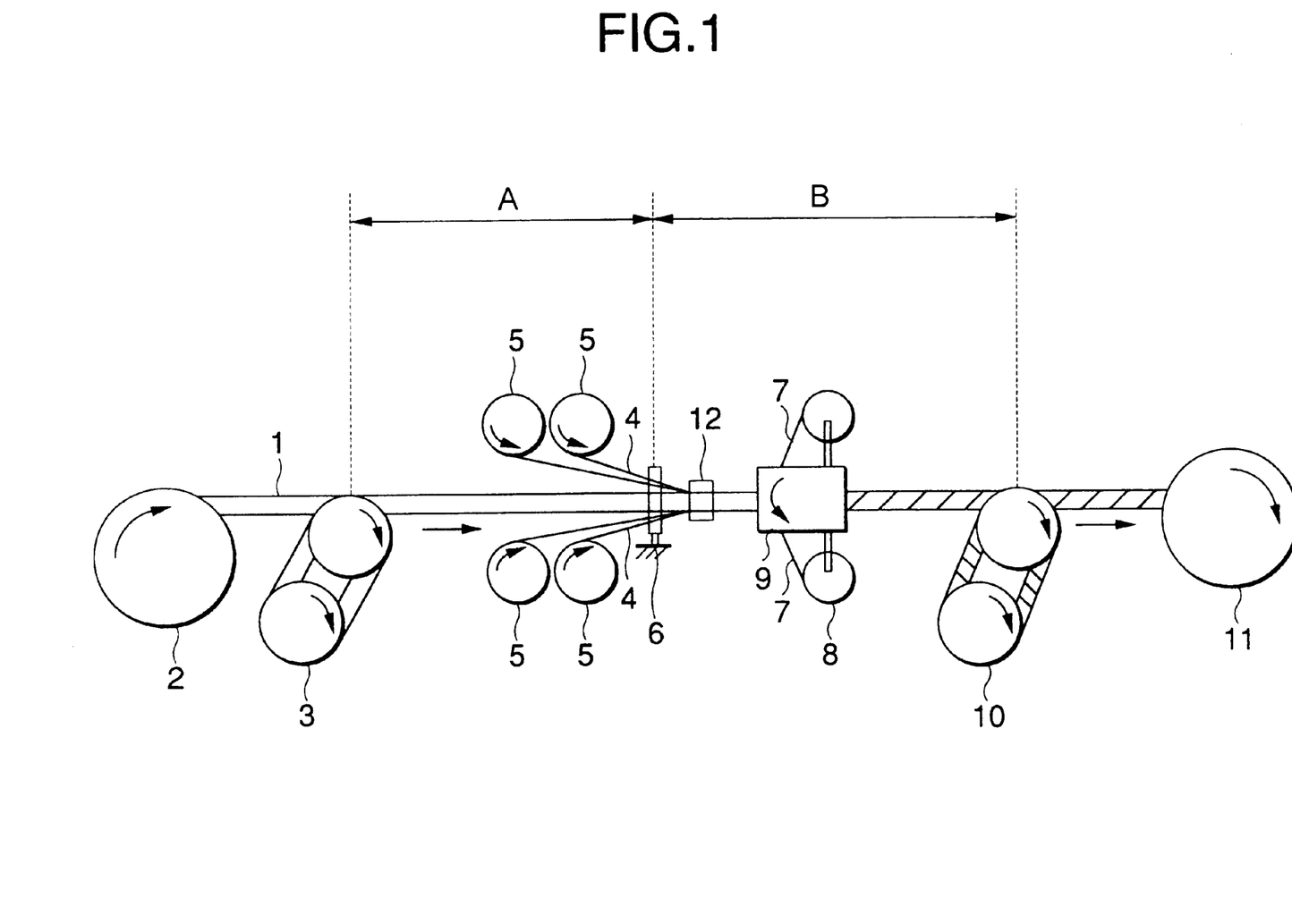
FIG. 1 is a view illustrating an embodiment of the present invention.
Figure 2:
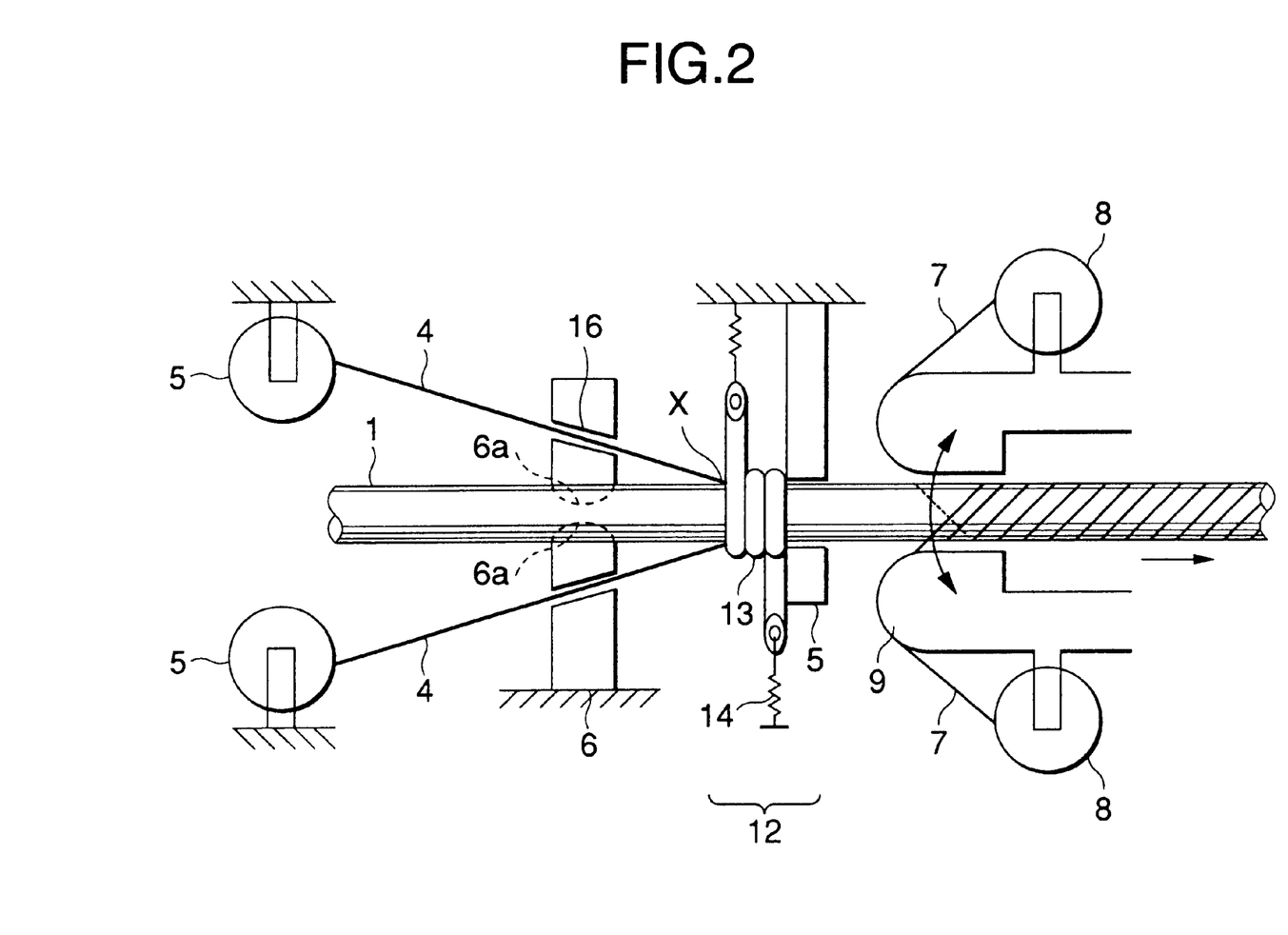
FIG. 2 in an enlarged view in the vicinity of a groove fixation device in the embodiment of the present invention.
Figure 3:
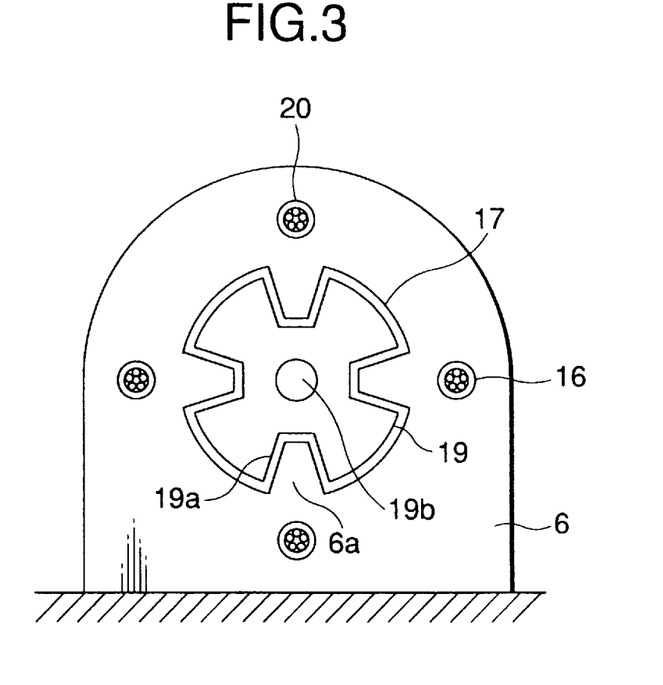
FIG. 3 is a view illustrating an embodiment of the groove fixation device.
Figure 4:
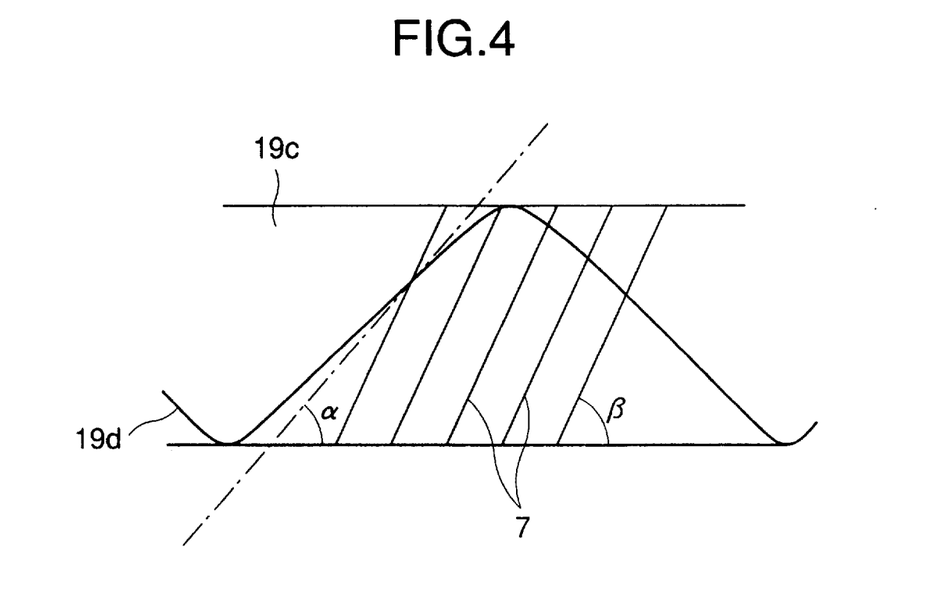
FIG. 4 is a view for explaining the relationship between the spiral angle of a groove of an SZ slotted body and the spiral angle of a pressing winding.

FIG. 1 is a view illustrating an embodiment of a manufacturing method or an SZ slot type optical fiber cable according to the present invention; FIG. 2 is a partially enlarged view thereof, FIG. 3 is a view illustrating an embodiment of a groove fixation device; and FIG. 4 is a view for explaining the relationship between a pressing winding and the spiral angle of spiral grooves. The same or equivalent parts are referenced correspondingly.

First, the whole configuration of the present invention will be described with reference to FIG. 1. An SZ slotted body 1 has grooves formed in its surface so as to turn over alternately. The SZ slotted body 1 is fed out from a supply reel 2, and then wound up on a take-up reel 11 through brake unit 3, a groove fixation device 6, an optical fiber insertion pressing unit 12, a pressing winding head 9, and a pulling device 10. A pulling force required for this advance is given by the pulling device 10, while a brake force is given against is the advance by the brake unit 3, so that the SZ slotted body is kept straight between the brake unit 3 and the pulling device 10.

Optical fibers 4 are respectively supplied from optical fiber supply reels 5 through the groove fixation device 6 and inserted into the grooves of the SZ slotted body 1 at the optical fiber insertion pressing unit 12.

Pressing windings 7 consisting of yarn, tape or the like are fed from pressing winding supply reels 8, and wound spirally on the SZ slotted body by pressing winding heads 9 rotating around the axis of the SZ slotted body, Then, the groove fixation device 6 has a function to keep constant the positions of the grooves of the SZ slotted body passing through the guide 6. Protrusions provided in and fixed to the groove fixation device 6 are inserted into the grooves of the SZ slotted body, as will be describe later. Since the grooves of the SZ slotted body are spirally formed so as to turn over alternately, the SZ slotted body on the opposite sides of the groove fixation device receives a torsional force and is distorted by fixing the positions of the grooves. In addition, this torsional force takes its maximum value at the spiral turn-over portion of the grooves of the SZ slotted body.

When the radius of the SZ slotted body in R, the force received from the protrusions by the grooves is F, and the torque given to the SZ slotted body is T, the relation of $T = F \times R$ is established. In addition, when the distances between the groove fixation device and torsion fixing units of the SZ slotted body on the opposite side of the guide are A and B respectively, the torsional rigidity of the SZ slotted body is G, and the maximum turn-over angle (which means half the angle at a circumference drawn by one groove when the SZ slotted body is viewed in the axial direction) of the grooves θ, the relation of $T = G \times (A+B) \times \theta / (A \times B)$ is established. Then, since the values R, G and θ are constants depending on the structure of the optical fiber cable, the value cannot be changed after the structure has been arranged once. As the manufacturing method, it is necessary to prevent the grooves from being injured or destroyed by an excessive force given to the grooves by the protrusions. For this, it is necessary to make the value F not larger than a predetermined value, and it is therefore necessary to makes the distances A and B as large as possible.

In FIG. 1, the brake unit 3 or the pulling device 10 which are constituted by a plurality of wheels, functions as a torsion fixing unit for preventing a torsional force given to the SZ slotted body by the groove fixation device from being transmitted to the supply reel 2 or the take-up reel 11 while preventing the SZ Slotted body 1 wound on the respective units from sliding.

Therefore, the distance between the brake unit 3 and the groove fixation device 6 corresponds to the distance A, while the distance between the pulling device 10 and the groove fixation device 6 corresponds to the distance B.

In the case of a generally used SZ slotted body the outer diameter of which is in a range of from 5 to 25 mm, an excessive force can be prevented from being giving to the grooves when the distances A and B are made 3 m or more respectively. In addition, the torsion of the SZ slotted body 1 generated by the groove fixation device 6 is distributed uniformly in the sections A and B, so that there is no possibility that the torsion injures the SZ slotted body. When the SZ slotted body is made from more fragile material than usual, or when the rigidity of its tensile strength body is higher than usual, it is necessary to make the length of the sections A and B larger.

FIG. 2 is a view in which the neighborhood of the groove fixation unit is enlarged. The optical fibers 4 from the optical fiber supply reel 5 fixed to the earth are, through holes 16 provided in the groove fixation device 5 and inserted into the grooves of the SZ slotted body 1 at an optical fiber insertion point X in front of the optical fiber insertion pressing unit 12.

The protrusions 6a of the groove fixation device 6 are inserted into the grooves of the SZ slotted body so as to fix the grooves which otherwise might rotate in response to the advance of the SZ slotted body in the axial direction. Accordingly, the SZ slotted body receives a reaction force from the protrusions, so that the SZ slotted body itself is distorted between the groove fixation device and the torsion fixing unit. In addition, since the grooves formed in the SZ slotted body turn over spirally alternately, this torsion is generated in alternate directions.

Since the positions of the grooves of the SZ slotted body 1 are fixed by the groove fixation device, the optical fibers, having passed through the holes 16 of the groove fixation device 6, are inserted into the grooves of the SZ slotted body 1 at substantially the same place. Then, in order to insert the optical fibers into the grooves as close to the groove fixation device 6 as possible, it is preferable that the holes 16 are provided as close to the SZ slotted body as possible, and it is preferable that the radius from the axis of the SZ slotted body to the holes is limited to two or less times as large as the radius of the SZ slotted body.

In addition, the optical fiber insertion pressing unit 12 is constituted by a fixed guide 15, and a winding string 13 disposed in front of the fixed guide and fixed at its opposite ends through springs 14, respectively. The winding string 13 is a smooth string consisting of nylon, polyethylene, Teflon, polypropylene, or the like, and one or more turns of the string 13 are wound on the SZ slotted body, Therefore, the optical fire 4 are inserted into the spiral grooves at the insertion point X, while partially rubbed by the winding string, Preferably, the distance between the insertion point X and the groove fixation device is made to be as small as possible, that is, made to be $\frac{1}{10}$ or less no large as the SZ-slots turn-over distance (corresponding to L in FIG. 5).

In addition, the pressing windings 7 consisting of yarn, tape or the like are fed from the preening winding supply reels 8, and wound spirally on the SZ slotted body by the pressing winding heads 9 rotating around the axis together with the pressing winding supply reels 8. When the distance between the optical fiber insertion point X and this pressing winding unit is long, the inserted optical fibers may jump out of the spiral grooves. It is therefore preferable to make the distance to be as snail as possible, that is, to make the distance to be $\frac{1}{3}$ or less, or $\frac{1}{4}$ or less, if possible, as large as the SZ-slots turn-over distance (corresponding to L in FIG. 5). In addition, although two pressing windings are used in FIG. 2 by way of example, the number of the pressing windings may be one, three or more. It is preferable to use a plurality of pressing windings, because, even if one of them is broken, the rest of the pressing windings prevent the optical fibers from jumping out.

FIG. 3 shows an embodiment of the groove fixation device. The groove fixation device 6 (which is fixed to the ground) has an SZ-slotted-body pass hole 17 provided in its center and a plurality of holes 16 for inserting a plurality of optical fibers provided in the outside of the SZ-slotted-body pass hole 17. In addition, the groove fixation device 6 has protrusions 6a for fixing grooves of an SZ slotted body passing the guide 6 so an to prevent the grooves from rotating. The protrusion 6a project into grooves 19a of an SZ slotted body 19. The reference numeral 19b represents a tensile strength body of the SZ slotted body; and 20, optical fibers. In addition, this groove fixation device 6 is about 3 mm thick, so that even when the grooves 19a are formed into spiral in the longitudinal direction of the SZ slotted body 19, the SZ slotted body 16 can pass through the groove fixation device 6 so long as a slight gap in provided between the grooves 19a and the protrusions 6a. in addition, although the number of protrusions may be one, it is preferable to make the number plural, corresponding to the number of the grooves, in order to disperse the force given from the protrusions to the grooves.

FIG. 4 is a view illustrating the relationship between the spiral angle of a groove of the SZ slotted body and the spiral angle of a pressing winding. The reference numeral 19c designates the surface of the SZ slotted body cut in the axial direction and developed; 19d, one of the grooves turning over alternately; and 7, a pressing winding wound on the surface of the SZ slotted body. The angle of the pressing winding 7 to the axial direction is β, and the maximum spiral angle of the alternatively turning-over spiral grooves to the axial direction is α. Since the grooves turn over spirally alternately, there in no fear that the pressing winding will fall into the groove especially in the case where the spiral direction of the groove is opposite to the winding direction of the pressing winding, but there is a possibility that the pressing winding falls into the groove so as to injure the optical fibers in the grooves when the angles α and β are close to each other especially in the case where the spiral direction of the groove is the same as the winding direction of the pressing winding. Therefore, when the angle β is made two or more times as large as the angle α, it is possible to prevent the pressing winding 7 from falling into the groove 19d even if the pressing winding 7 becomes loose a little.

Figure 8:
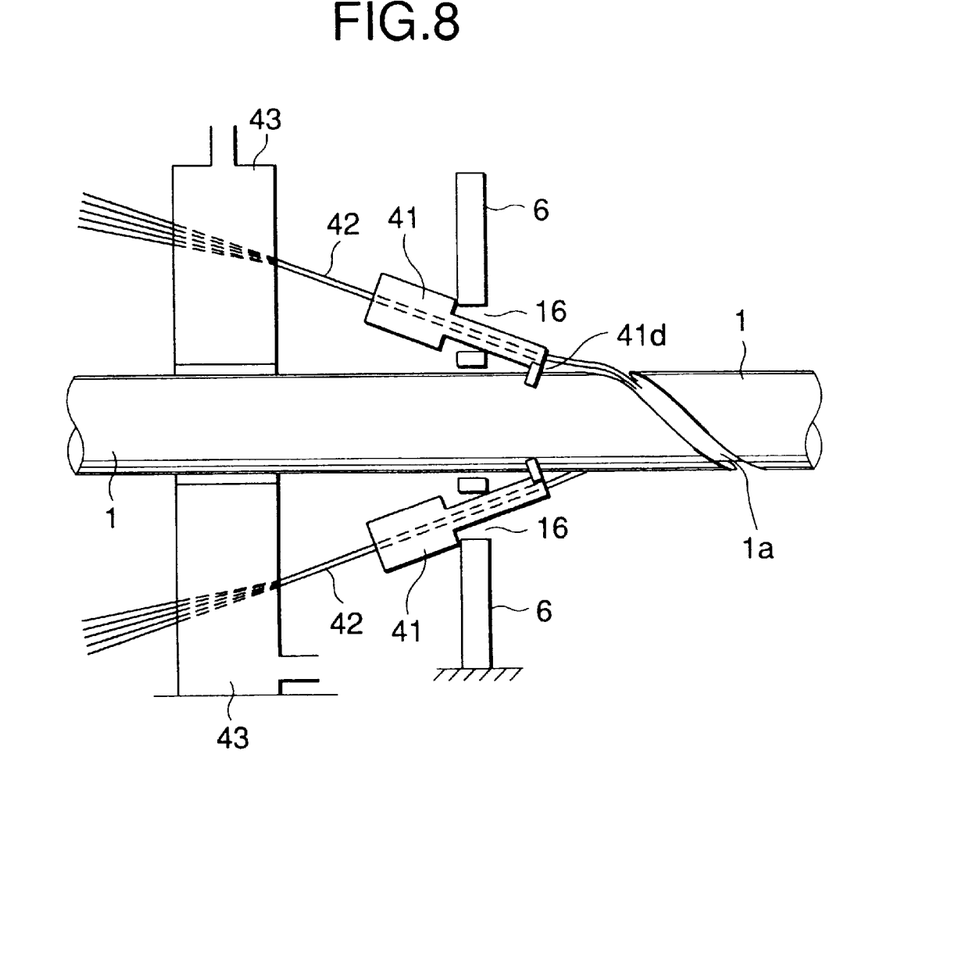
FIG. 8 is a front view of an apparatus in the vicinity of a groove fixed guide.
Figure 9A:
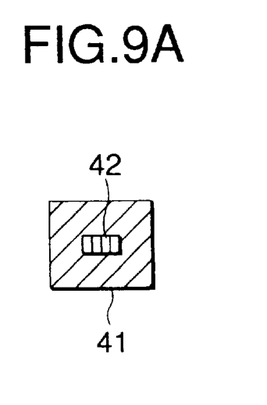
FIG. 9A is a left side view of a guide portion.

In addition, in the case where a plurality of glass coated fibers are to be disposed side by side and collectively coated so as to be made into a ribbon-like optical fiber unit, and a plurality of such ribbon-like optical fiber units are to be stacked in each groove of the SZ slotted body, it is necessary to insert the ribbon-like optical fiber units to be stacked into the groove of the SZ slotted body in a manner so that the ribbon-like optical fiber units may be orderly stacked in the groove. In that case, as shown in FIGS. 8 and 9, a guide 41 is provided, with a clearance, through an optical fiber insertion hole 16 of the groove fixation device 6, and a stack of ribbon-like fiber units 42 is inserted through the hole of the guide 41. FIG. 8 is a front view of the apparatus in the vicinity of the groove fixation device. FIG. 9A is a left side view of the guide portion, FIG. 9B is a plan view of the guide portion, and FIG. 9C is a right side view of the guide portion, For a cable in which stacks of ribbon-like optical fiber units 42 are inserted into the grooves of the SZ slotted body, in order to reduce the friction between the optical fiber units or between any optical fiber unit and the groove, a talc coating unit 43 may be provided in front of the guide 41 in accordance with necessity, for performing the working of sprinkling and coating the tapes of the stack of ribbon-like fiber body 42 with talc.

Figures 9B, 9C:
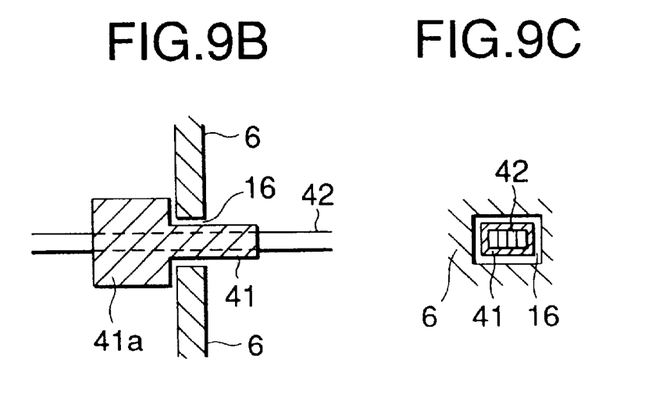
FIG. 9B is a plan view of the guide portion.
FIG. 9C in a right side view of the guide portion.

In addition, the guide 41 is provided so as to penetrate, with a clearance, the hole 16 of tho groove fixation device 6, and a swelled portion 41a larger than the hole 16 is further provided on the left side of the guide so as to prevent the groove fixation device 6 from being detached from the hole 16 to the right as shown in FIG. 9B. Further, the outer circumference of the portion of the guide 41 which penetrates the hole 16 of the groove fixation device 6 is made angular and also the hole 16 is made angular as shown in FIG. 9C. The size of the hole 16 is made small enough so as to prevent the guide 41 from rotating in the hole 16, that is, the longitudinal or lateral inner width of the hole 16 in the penetrating portion is made smaller than the diagonal line of the guide 41.

Figure 10:
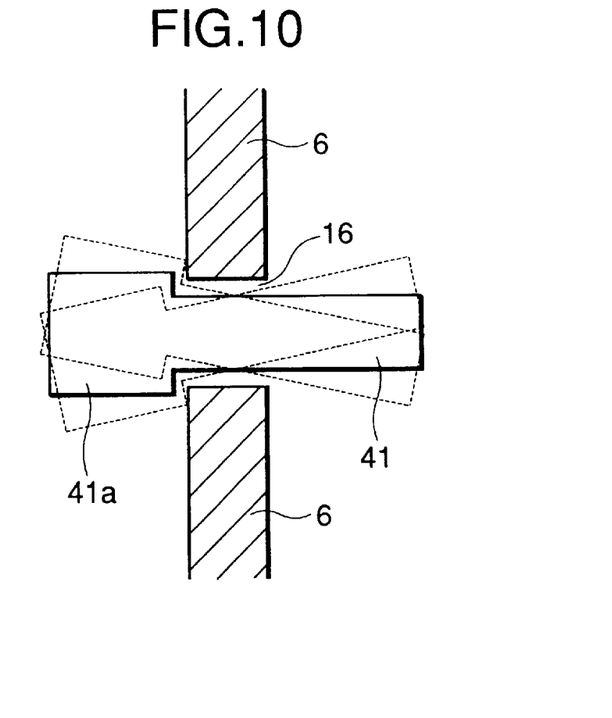
FIG. 10 is a view for explaining the oscillation of the guide.

In addition, when the guide 41 is made to penetrate the hole 16 with an enough clearance to oscillate with respect to the groove fixation device 6 an shown in FIG. 10, the guide 41 can oscillate in accordance with the direction of the stack of ribbon-like fiber body 42 passing through the guide 41. Accordingly, it is possible to guide the stack of ribbon-like fiber body 42 into a groove of the 83 slotted body smoothly.

Figure 11:
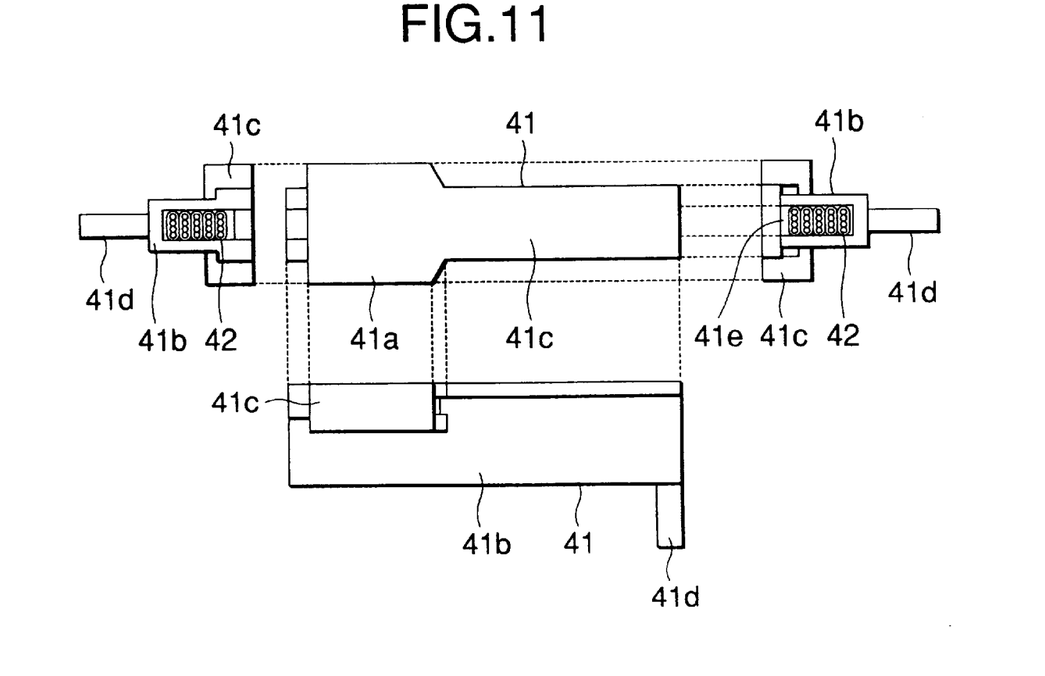
FIG. 11 is a view illustrating an example of the guide in detail.

FIG. 11 is a view illustrating an example of the guide 41 In detail. The guide 41 is constituted by a base member 41b with an angular groove, a cover member 41c, and a protrusion 41d. The cover member 41c is removably fitted to a protrusion (not shown) provided on the base member 41b, and the base member 41b and the cover member 41a define a sectionally rectangular hole 41e through which the stack of ribbon-like fiber body 42 is inserted. In addition, a swelled portion 41a is provided in the cover member 41c so as to prevent the guide 41 from being detached from the hole 16 of the groove fixation device 6.

The guide is made from a metal or hard plastic material, and has a size of 5 to 10 mm×5 to 10 mm×30 to 70 mm.

The reason why the cover member 41c and the base member 41b are made removable is to facilitate passage or the stack of ribbon-like fiber body 42 in the first place. This is therefore not an essential condition. That is, the cover member and the base member may be formed integrally. In addition, when the apparatus is running normally, the stack of ribbon-like fiber body 42 moves closely to the bottom of the groove of the base member 41b by the tension given thereto in its longitudinal direction. Therefore, the guide 41 can fulfill its function without the cover member 41c. Then, when the cover member is not provided, it is necessary to provide a portion corresponding to the swelled portion 41a in the base member us an to prevent the guide from being detached from the groove fixation device.

In addition, the protrusion 41d is provided in accordance with necessity. If the protrusion 41d is made to be partially inserted into a groove of the SZ slotted body, the head of the guide 41 oscillates in accordance with the change of the angle of approach of the stack of ribbon-like fiber body to a groove of the SZ slotted body due to the gap between the groove fixation device 6 and the point where the stack of ribbon-like fiber body is inserted into the groove. Accordingly, it is possible to guide the stack of ribbon-like fiber body into a groove of the SZ slotted body sore smoothly.

Figure 12:
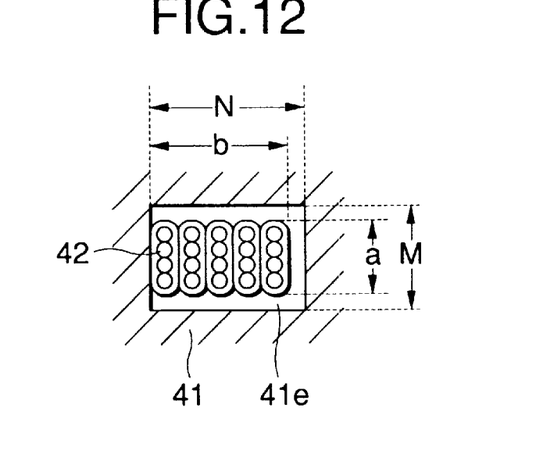
FIG. 12 is a view for explaining the relationship between the size of a hole of the guide and the size of a stacked ribbon-like fiber body.

FIG. 12 is a view for explaining the relationship between the size in section of a hole 41e of the guide 41 and the size of a stack of ribbon-like optical fiber unit. In order to prevent the state of the stack of ribbon-like optical fiber unit from being disordered, it is necessary to make the hole have a size which does not allow a stack of ribbon-like optical fiber unit to rotate in the hole, that is, it is necessary to take the width or height of the hole be smaller than the diagonal line of the stack of ribbon-like optical fiber unit. Accordingly, it is-desirable to make the width M of the hole 41e of the guide be 1–1.5 times as large as the width A of the stack of ribbon-like optical fiber unit 42, and is to make the height N of the hole 41e of the guide be 1–1.3 times an large an the stack height b of the stack of ribbon-like optical fiber unit 42.

Figure 13:
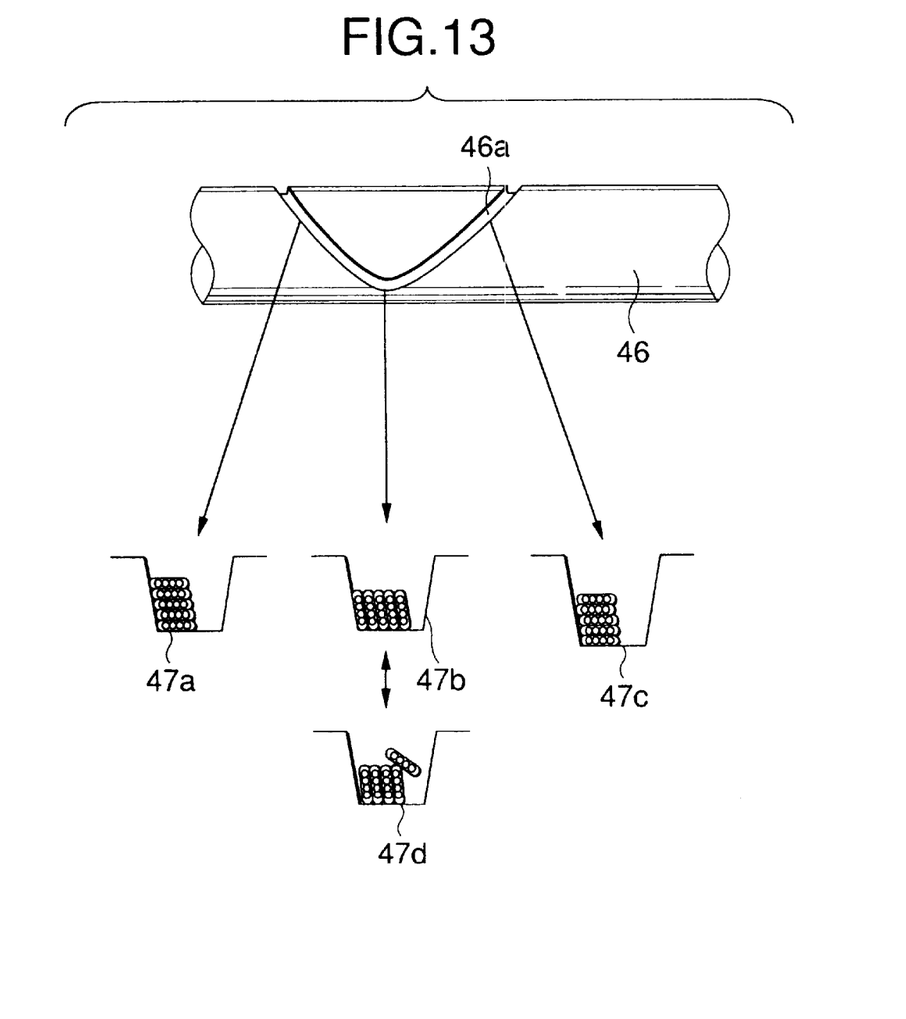
FIG. 13 is a view for explaining the stacked state of the stacked ribbon-like optical fiber unit in the groove of the SZ slotted body.

FIG. 13 shows the state of the stack of ribbon-like optical fiber unit in the groove 46a of the SZ slotted body 46. In the groove 46a, the stack of ribbon-like optical fiber unit may take a state in which the ribbon-like units of the stack of ribbon-like optical fiber unit are arranged in parallel with the bottom surface of the groove and shown in 47a and 47c, and, according to a location, another state in which the stack of ribbon-like optical fiber units are arranged so as to be substantially perpendicular to the bottom surface of the groove as shown in 47b.

On the other hand, there may be a case where, in order to facilitate insertion of the optical fibers into a groove of the SZ slotted body and in order to prevent excessive stress from applying to the optical fibers, the section of the groove of the SZ slotted by is made not to be a rectangular but a trapezoid with its opening spread. In such a case, sometimes, the arrangement of the stack of ribbon-like optical fiber unit is partly disordered so that a part of the stack of ribbon-like optical fiber unit rides on the rest as shown in 47d. In order to prevent such a disadvantage from occurring, if the stack at ribbon-like optical fiber unit in allowed to rotate in the hole of the guide, it becomes possible to insert the stack of ribbon-like optical fiber unit into the groove smoothly. To cope with this, an example of the guide will be described with reference to FIGS. 14A to 14C.

Figure 14A:
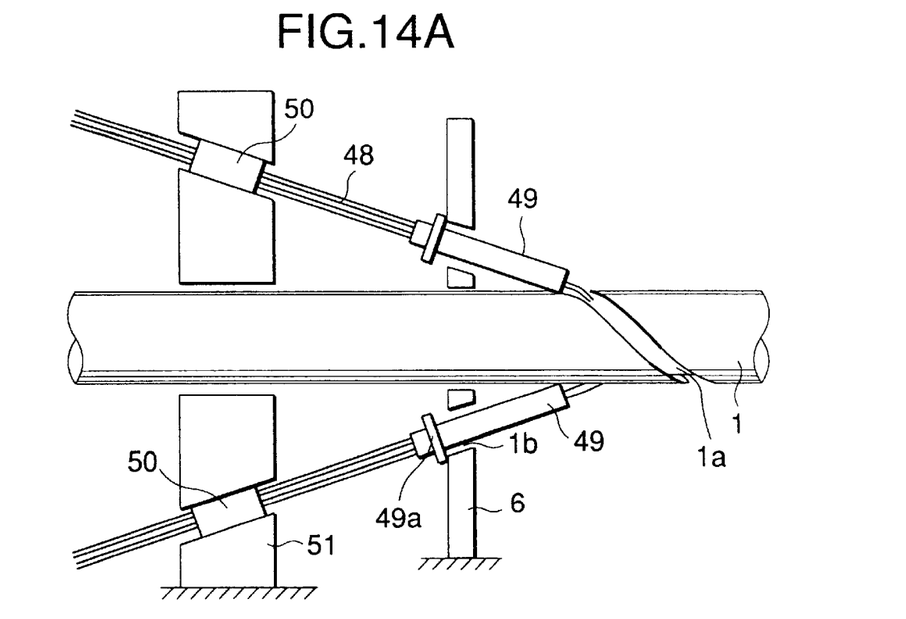
FIG. 14A is a front view showing another example of the guide.
Figure 14B:
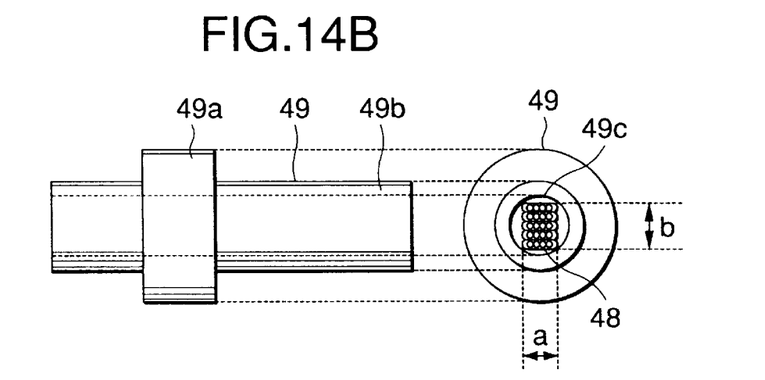
FIG. 14B is plan and side views of the guide, and FIG. 14C in front and side views of the arrangement keeping guide.
Figure 14C:
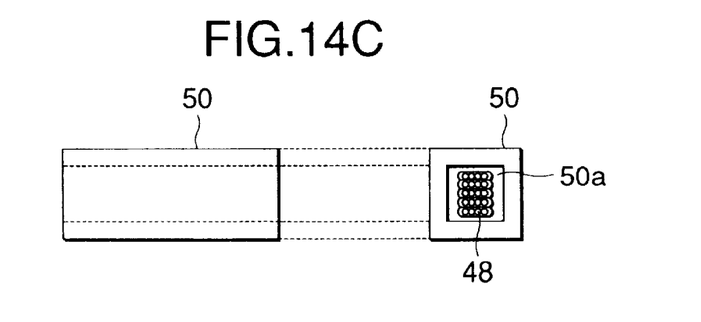

FIGS. 14A to 14C show an example of the guide having a hole circular in section. FIG. 14A is a front view showing the apparatus in the vicinity of the guide, FIG. 14B is front and side views of the guide, and FIG. 14C is front and side views of the arrangement keeping guide.

As shown in FIG. 14A, a stack of ribbon-like optical fiber unit 4B is introduced into a groove is of a SZ slotted body 1 through holes of an arrangement keeping guide 50 and a guide 49. The guide 49 is inserted through a hole 16 of a groove fixation device 6 with a clearance so that the guide 49 can oscillate similarly to the guide shown in FIG. 10. Although the arrangement keeping guide 50 is fixed to a fixing table 51 in this case, there may be a case where such an arrangement keeping guide is not provided.

An example of the shape of the guide is shown in FIG. 14B. The guide 49 is constituted by a cylindrical portion 49b and a flange portion 49a, and has a hole 49c circular in section. Since the stack of ribbon-like optical fiber unit 48 is inserted through this hole 49c, the diameter of the hole 49c is made lager than the length of the diagonal line of the stack of ribbon-like optical fiber unit but not larger than the sum of the length of the diagonal line of the-stack of ribbon-like optical fiber unit and the thickness of one unit sheet of the stack of ribbon-like optical fiber unit, that is, the diameter of the hole is made equal to about the sum of the length of the diagonal line of the stack of ribbon-like optical fiber unit and 0.15–0.20 mm, so that the stacked ribbon-like optical fiber unit can rotate easily but the stacked state of the stacked ribbon-like optical fiber unit is not disordered. Further, as the guide 49, it is preferable to use a material slidable easily, for example, such an polyethylene, tetrafluoride resin, etc. Of course, metal can be used. Further, the length of the guide 49 is made to be about 30–70 mm.

Further, an example of the shape of the arrangement keeping guide is shown in FIG. 14C. The arrangement keeping guide 50 has a hole 50a rectangular in section the size of which does not allow the stacked ribbon-like optical fiber unit to rotate. Also this arrangement keeping guide 50 is made from a plastic material or metal. The length of the arrangement keeping guide 50 is made to be about 10–50 mm. Further, each of the arrangement keeping guide 50 and the guide 49 may be halved so that each of them is constituted by a combination of two members. In such a configuration, it is made easy to perform the work of inserting the stacked ribbon-like optical fiber unit through the guides 50 and 49 at the first time.

In the present invention, two or more torsion fixing units holding an SZ slotted body are provided around the slot axis so an to prevent the SZ slotted body from being distorted, and between two torsion fixing units, a groove fixation device having one or more protrusions projecting into grooves of the SZ slotted body is provided so an to prevent the grooves from turning around the axis. The SZ slotted body is passed through the groove fixation device while the SZ slotted body in advanced straight. Optical fibers are introduced and stored into the groves of the SZ slotted body in the vicinity of the groove fixation device, and immediately a pressing winding consisting of yarn, tape or the like is wound on the SZ slotted body. Accordingly, the grooves of tho SZ slotted body pass while being fixed at a special place by the groove fixation device even if torsion locally dwelling in the SZ slotted body itself is released by the advance of the SZ slotted body, so that no influence is given to the optical fibers inserted in the vicinity or the place.

Accordingly, it is possible to increase the speed of manufacturing. While the manufacturing speed has been 3 to 5 m/min in conventional manufacturing methods, it can be improved to 15 to 25 m/min according to the manufacturing method of the present invention, so that it is possible to obtain an effect to reduce the cost on a large scale.

In addition, in the case where the optical fibers are made into a stacked ribbon-like fiber body, If a guide penetrating a hole of the groove fixation device is provided to guide the stacked ribbon-like fiber body into the groove of the SZ slotted body through a hole of the guide, it is possible to insert the stacked ribbon-like fiber body into the groove smoothly while keeping the stacked state thereof.

Further, if a guide having a hole circular in section is used and an arrangement keeping guide is provided in front of the first-mentioned guide, it is possible to introduce the stacked ribbon-like optical fiber unit into the groove of the SZ slotted body smoothly while keeping the stacked state of the stacked ribbon-like optical fiber unit and it is possible to prevent the arrangement of the stacked ribbon-like optical fiber unit from being disordered at the turn-over portion of the groove.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is the claimed is:

1. A method of manufacturing an optical fiber cable comprising an SZ-slot type body having a radius with grooves in its surface spiraling along its axis so as to turn over alternately through a slot turn-over distance, said method comprising the steps of:

providing at least two torsion fixing devices around the axis to hold the body and prevent it from being distorted;

passing the body from a first of the at least two torsion fixing devices through a stationary groove fixation device to a second of the at least two torsion fixing devices, the groove fixation device having one or more protrusions projecting into the grooves, permitting the body to advance while the grooves remain in substantially constant circumferential positions about the axis, wherein the first of the at least two torsion fixing devices is disposed a first predetermined distance before the groove fixation device, and wherein the second of the at least two torsion fixing devices is disposed a second predetermined distance after the groove fixation device;

introducing and storing optical fibers in the grooves at an insertion point after the groove fixation device; and applying a winding, at a winding point, comprising yarn or tape, onto the body after the insertion point.

2. The method of claim 1, wherein the first at least one torsion fixing unit is a brake unit comprising a plurality of wheels for giving a braking force to advancing of the body, and the second at least one torsion fixing unit is a pulling device comprising a plurality of wheels giving a pulling force to the body.

3. The method of claim 1, wherein the first and second predetermined distances are about 3 m or more respectively.

4. The method of claim 1, wherein one or more holes are provided circumferentially to said groove fixation device at a radial distance from the axis not more than about two times greater than the radius of the body and the optical fibers are passed through the holes before the insertion point.

5. The method of claim 1, wherein a distance between the groove fixation device and the insertion point is about 1/10 or less of the slot turn-over distance.

6. The method of claim 1, further comprising the step of:

pressing the optical fibers into the grooves by a pressing unit at a pressing point, wherein the pressing unit comprises one or more turns of string, with its opposite ends fixed through springs, wound around an outer circumference of the body at a predetermined distance after the insertion point.

7. The method of claim 6, wherein the predetermined distance between the insertion point and the pressing point is not more than about 1/3 of the slot turn-over distance.

8. The method of claim 1, wherein a spiral angle of the winding is about two or more times greater than a maximum spiral angle of the grooves.

9. The method of claim 1, wherein the first and second predetermined distances are established as a function of the body's fragility or rigidity.

10. The method of claim 1, wherein the body passes from the first of the at least two torsion fixing devices, through the groove fixation device, to the second of the at least two torsion fixing devices at a speed of more than about 5 m/min.

11. A method of manufacturing an SZ-slot type optical fiber cable in which optical fibers are stored in spiral grooves which are formed in a surface of a columnar SZ slotted body so as to turn over alternately, said method comprising the steps of:

providing at least two torsion fixing devices around a slot axis to hold said SZ slotted body so as to prevent said SZ slotted body from being distorted;

passing said SZ slotted body through a groove fixation device while said SZ slotted body is advanced straight from a first of said at least two torsion fixing devices, through said groove fixation device, to a second of said at least two torsion fixing devices, said groove fixing device having one or more protrusions projecting into said grooves of said SZ slotted body to allow its advance while retaining the positions of the grooves substantially constant circumferentially;

introducing and storing optical fibers into said grooves of said SZ slotted body in the vicinity of said groove fixation device;

immediately thereafter applying a winding consisting of yarn or tape onto said SZ slotted body; and pressing said optical fibers into the grooves by a pressing unit comprising one or more turns of string, with its opposite ends fixed through springs, wound around an outer circumference of said SZ slotted body at an insertion point near where said optical fibers are inserted into said spiral grooves formed in said SZ slotted body so as to turn over alternately.

12. A method of manufacturing an SZ-slot type optical fiber cable in which optical fibers are stored in spiral grooves which are formed in a surface of a columnar SZ slotted body so as to turn over alternately, said method comprising the steps of:

providing at least two torsion fixing devices around a slot axis to hold said SZ slotted body so as to prevent said SZ slotted body from being distorted;

passing said SZ slotted body through a groove fixation device while said SZ slotted body is advanced straight from a first of said at least two torsion fixing devices, through said groove fixation device, to a second of said at least two torsion fixing devices, said groove fixing device having one or more protrusions projecting into said grooves of said SZ slotted body to allow its advance while retaining the positions of the grooves substantially constant circumferentially;

introducing and storing optical fibers into said grooves of said SZ slotted body in the vicinity of said groove fixation device; and immediately thereafter applying a winding consisting of yarn or tape onto said SZ slotted body, wherein a spiral angle of said winding consisting of yarn, tape or the like is two or more times as large as a maximum spiral angle of said grooves of said SZ slotted body.

13. An apparatus for manufacturing an optical fiber cable comprising an SZ-slot type body having a radius with grooves in its surface spiraling along its axis so as to turn over alternately through a slot turn-over distance, the apparatus comprising:

at least two torsion fixing devices disposed along the axis to hold the body and prevent it from being distorted;

a groove fixation device disposed between a first and a second of the at least two torsion fixing devices, the groove fixation device having protrusions projecting into the grooves to permit the body to advance while the grooves remain in substantially constant circumferential positions about the axis, wherein the first of the at least two fixation devices is disposed a first predetermined distance before the groove fixation device, and wherein the second of the at least two fixation devices is disposed a second predetermined distance after the groove fixation device;

at least one guide for introducing and storing optical fibers in the grooves at an insertion point after the groove fixation device; and a winding device disposed after the insertion point for applying a winding, at a winding point, onto the body.

14. The apparatus of claim 13, wherein the at least one guide is disposed, with a clearance, through one of the holes of the groove fixation device.

15. The apparatus of claim 14, wherein the at least one guide, due to the clearance, may oscillate at an angle with respect to the groove fixation device in accordance with an insertion direction of the optical fibers.

16. The apparatus of claim 14, wherein the at least one guide includes a protrusion at a front end for insertion into one of the grooves of the body to track the groove and change the guide's penetration angle with respect to the groove fixation device.

17. The apparatus of claim 13, wherein the at least one guide has a rectangular hole therethrough dimensioned to prevent rotation of a stack of ribbon-like optical fiber units therein.

18. The apparatus of claim 13, wherein the at least one guide has a circular hole with a diameter greater than a diagonal length of a cross-section of a stack of ribbon-like optical fiber units but not greater than the sum of the diagonal length and a thickness of one optical fiber ribbon unit from the stack.

19. The apparatus of claim 18, further comprising an arrangement keeping guide provided at a front of the at least one guide, the arrangement keeping guide having a rectangular hole dimensioned so that the stack of ribbon-like optical fiber units inserted therethrough cannot rotate.

20. The apparatus of claim 13, wherein the first and second predetermined distances are more than about 3 m.

21. The apparatus of claim 13, wherein the holes through the groove fixation device are disposed a radial distance from the axis not greater than about two times the radius of the body.

22. The apparatus of claim 13, wherein a distance between the groove fixation device and the insertion point is about $\frac{1}{10}$ or less of the slot turn-over distance.

23. The apparatus of claim 13, further comprising:

a pressing unit for pressing the optical fibers into the grooves at a pressing point, wherein the pressing unit comprises one or more turns of string, with its opposite ends fixed through springs, wound around an outer circumference of the body at a predetermined distance after the insertion point.

24. The apparatus of claim 23, wherein the predetermined distance between the insertion point and the pressing point is not more than about $\frac{1}{3}$ of the slot turn-over distance.

25. The apparatus of claim 13, wherein the winding device winds the winding at a spiral angle that is about two or more times greater than a maximum spiral angle of the grooves.

26. The apparatus of claim 13, wherein the winding comprises yarn or tape.

27. The apparatus of claim 13, wherein the first and second predetermined distances are established as a function of the body's fragility or rigidity.

28. The apparatus of claim 13, wherein the body passes from the first of the at least two torsion fixing devices, through the groove fixation device, to the second of the at least two torsion fixing devices at a speed of more than about 5 m/min.

* * * * *